United States Patent
Vogt et al.

[11] 3,791,296
[45] Feb. 12, 1974

[54] ICE DEMOLITION CHARGE

[75] Inventors: Charles C. Vogt, Bethesda; John W. Talcott, Decatur Heights; Donald M. Leslie, Silver Spring; Clark W. Dovell, Silver Spring; Samuel J. Black, Silver Spring, all of Md.

[73] Assignee: The United States of America as represented by the Secretary of the Navy, Washington, D.C.

[22] Filed: July 27, 1960

[21] Appl. No.: 45,768

[52] U.S. Cl. .......................... 102/10, 102/13, 102/18
[51] Int. Cl. ............................................. F42b 22/00
[58] Field of Search.. 102/7, 2, 13, 14, 10, 16, 19.2, 102/12, 11, 18; 89/1.5 F

[56] References Cited
UNITED STATES PATENTS

| | | | |
|---|---|---|---|
| 952,450 | 3/1910 | Leon | 102/14 |
| 1,473,148 | 11/1923 | Hammond, Jr. | 102/7 |
| 2,705,919 | 4/1955 | Semon | 102/10 |
| 1,290,054 | 1/1919 | Bertrand | 102/13 |
| 1,531,550 | 3/1925 | Glennon | 89/1.5 |
| 2,960,030 | 11/1960 | Semon | 102/16 |

FOREIGN PATENTS OR APPLICATIONS

| | | | |
|---|---|---|---|
| 578,258 | 5/1946 | Great Britain | 102/7 |

*Primary Examiner*—Samuel W. Engle
*Attorney, Agent, or Firm*—R. S. Sciascia; J. A. Cooke; T. O. Watson

EXEMPLARY CLAIM

1. A surface seeking underwater demolition device capable of being ejected from a torpedo tube for blasting a passageway in an ice pack to allow an underwater craft to surface comprising a casing, a float removably attached to one end of said casing, said float causing the device to be buoyant so that it will rise to the underside of the ice pack, guide fins removably attached to the other end of said casing, a copious quantity of explosives located in said casing, a hydrostatically actuated switch in said casing, delay means actuated by said hydrostatic switch for delaying operation of said device a short period of time, a source of electrical power connected to one side of said delay means, an electro-responsive squib connected between the other side of said delay means and said source of electrical power, a releasing pistol located on said casing with said squib mounted therein, a connecting cable normally holding said float to said casing and passing through said releasing pistol, a cutter located in said releasing pistol for cutting said connecting cable when operated by said squib to release said float, a standoff cable attached to said casing and said float for suspending said casing at a depth of several feet below said float, an electrical switch, pressure sensitive means for determining when the casing has been suspended below said float and for closing said electrical switch, and detonating means connected to said source of electrical power by said electrical switch for detonating the quantity of explosives.

3 Claims, 8 Drawing Figures

INVENTORS.
C. C. VOGT, J. W. TALCOTT,
D. M. LESLIE, C. W. DOVELL;
BY    S. J. BLACK.

W. O. Quesenberry
J. P. Hodges
ATTYS

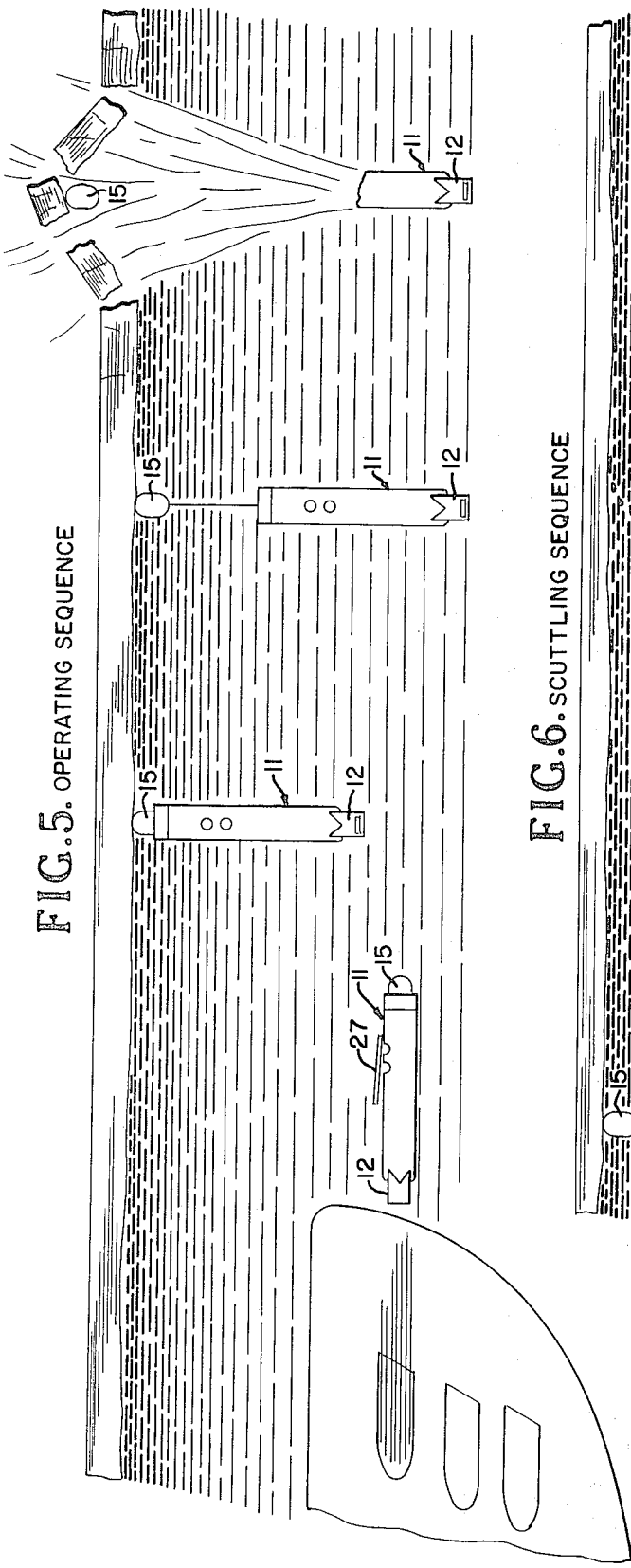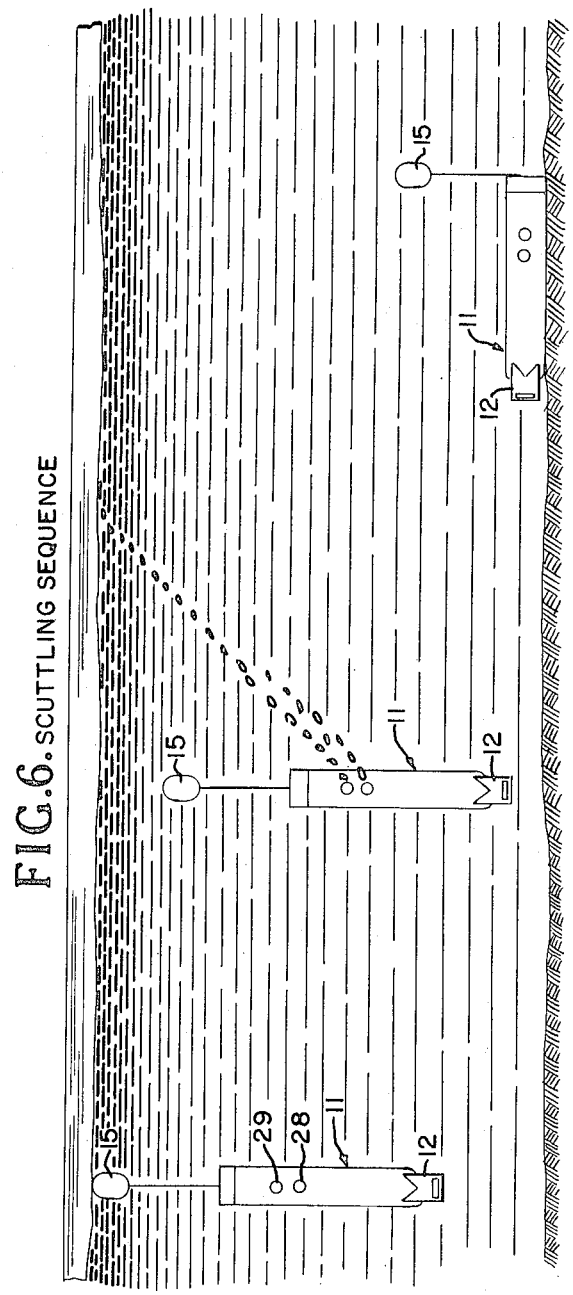

INVENTORS.
C. C. VOGT, J. W. TALCOTT,
D. M. LESLIE, C. W. DOVELL,
S. J. BLACK.

BY

ATTORNEYS.

ICE DEMOLITION CHARGE

The invention described herein may be manufactured and used by or for the Government of the United States of America for governmental purposes without the payment of any royalties thereon or therefor.

The present invention relates to the underwater demolition art and more particularly to a device for blasting a hole through an ice pack thereby allowing a submarine under the ice pack to have access to the surface.

As a result of the atomic submarine discovering a northern route under the Arctic ice pack, it became apparent that access to the surface through the ice pack would be necessary if an emergency should occur. It was realized that it was necessary for the submarine to have access to the surface without damaging the ship's superstructure.

It is an object of this invention to provide a means for allowing an underwater device access to the surface from a position beneath an ice pack without peril.

It is still another object to provide a new and improved underwater demolition device for providing an access through the ice pack for an underwater device.

It is still another object to provide a new and improved underwater demolition device capable of being fired from a submarine and rising to a position in close proximity of the ice pack before being detonated.

It is a further object to provide a new and improved demolition device capable of being fired from a submarine and rising to close proximity of the ice pack before the firing circuit is actuated, should the firing circuit fail to actuate within a predetermined time then the device will scuttle itself.

It is still a further object to provide a new and improved demolition device that will disarm itself should it become entangled with part of the submarine after it has been ejected therefrom into the water.

It is yet another object to provide a new and improved underwater demolition device capable of being carried for extended periods of time in a submarine and remaining in a safe condition.

Further objects and the entire scope of the invention will become further apparent in the following detailed description and in the appended claims. The accompanying drawings display the general construction and operational principles of the invention; it is to be understood, however, that the drawings are furnished only by way of illustration and not in limitation thereof and wherein:

Figure 7:
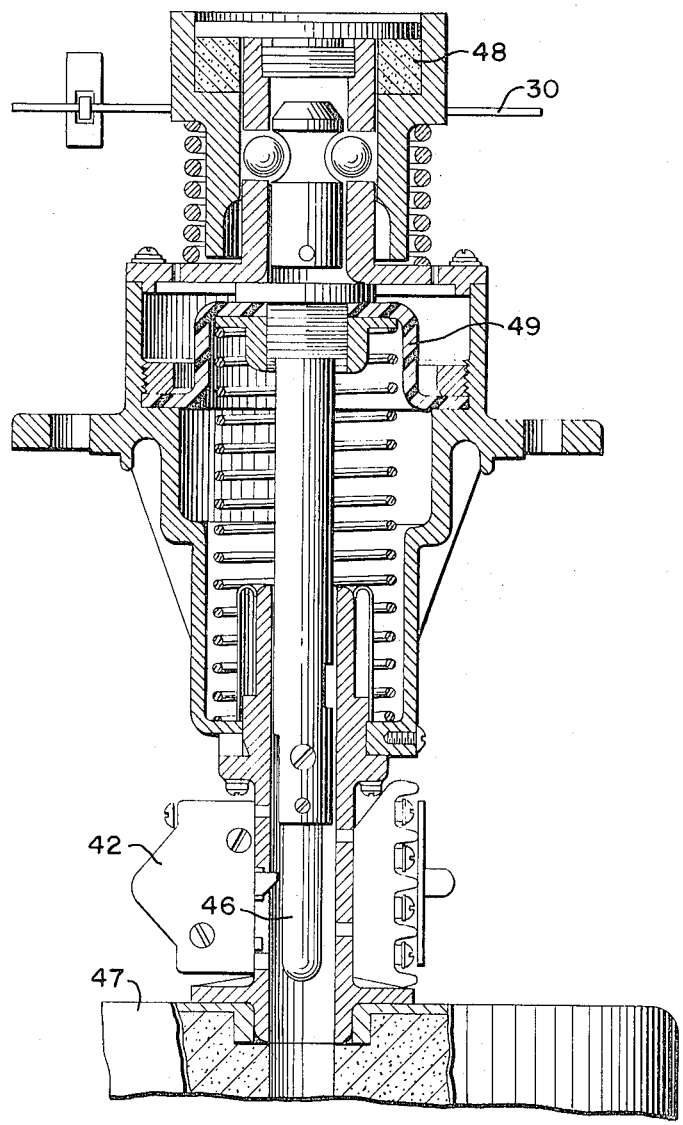
Figure 8:
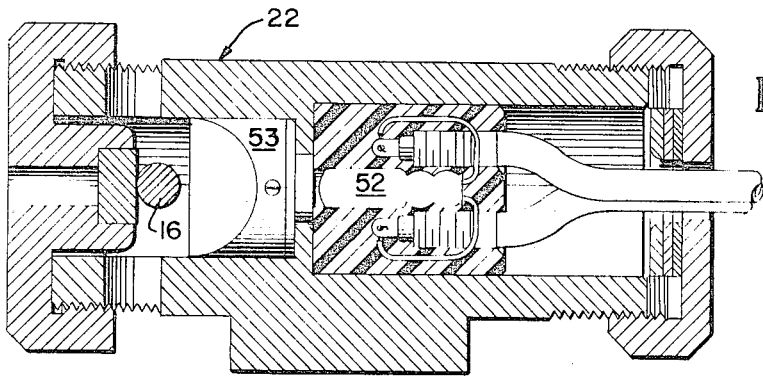

FIG. 5 discloses the operating sequence of the device after it leaves the submarine;

FIG. 6 discloses the scuttling sequence if the device is ineffective and fails to explode;

FIG. 7 discloses a sectional view of the extender mechanism for moving the detonator to an in line position with respect to the booster charge; and FIG. 8 discloses a sectional view of the releasing pistol.

Figure 1:
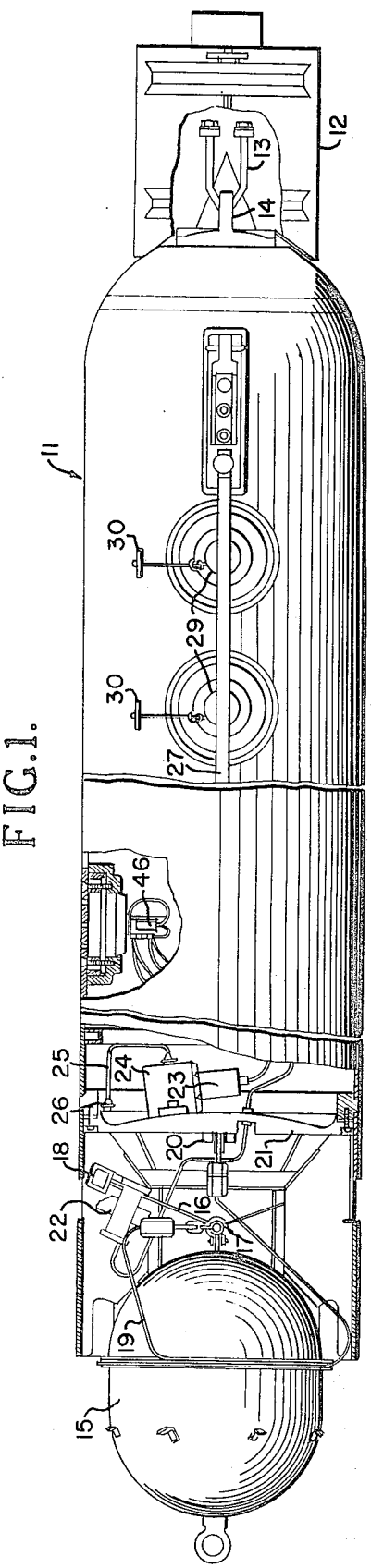
FIG. 1 is a plan view, partly in section, of the invention.

Referring now to the drawings wherein like reference characters designate like or corresponding parts throughout the several views, there is shown in FIG. 1 the casing 11 containing approximately 640 pounds of HB X-3 explosive and the mechanism required to detonate it, when planted, which will be more fully described herein. The casing 11 is designed to be launched from any United States submarine with 21-inch torpedo tubes. The casing is fitted with guide blocks (not shown) to position it in the tube.

The casing 11 is provided with a fin assembly 12 that is bolted thereon by means of a bolt 13 passing through the pad eye 14 which is located on one end of the casing 11.

Figure 2:
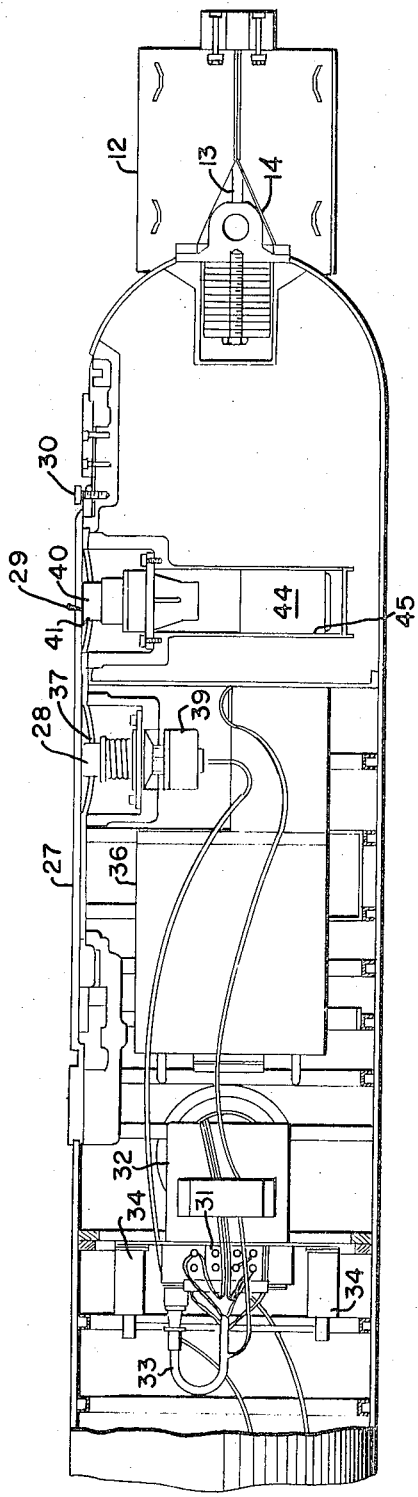
FIG. 2 is a diagrammatic view partly in section taken along line 2—2 of FIG. 1.

The fin assembly 12 more clearly shown in FIG. 2 may be removed during storage and handling of the device, if desired.

On the other end of casing 11 is disposed, float 15 which is held in position by a steel retention cable 16 passing through shackle 17 and connected to cable lugs 18 on opposite sides of casing 11. A 14-foot steel cable 19 is wrapped around the float 15 with one end attached to a clevis 20 located on partition 21 of the device. The other end of the cable is attached to the float 15 by shackle 17.

The float retention cable 16 is passed through a releasing pistol 22 as shown in FIG. 8 in its normal position. The releasing pistol contains an explosive fitting 52 which when activated will drive a cutter 53 through the retention cable 16 thereby releasing the float 15. The steel cable 19 unwinds from the float 15 allowing the explosive charge to drop to a position about 20 feet below the under surface of the ice pack for maximum explosive effect.

The hydroswitch 23 and switch housing 24 are secured to the inboard side of partition 20. The switch is responsive to the water pressure and is connected to the water by a hydraulic line 25. The hydraulic line has a connection 26 extending through the partition 20.

The safety bar 27 normally holds the clock starter switch 28 and the extender mechanism switch 29 in the unenergized position. The safety bar is maintained in the normal position by screw 30. When the device is placed in a torpedo tube the screw 30 is removed. As the device is ejected from the tube the safety bar falls free allowing the two switches 28 and 29 to operate. As shown in FIG. 1 each of the switches 28 and 29 has an individual safety pin 30 which must be removed prior to inserting the device in the torpedo tube.

Referring now to FIG. 2 wherein the batteries 31 are located in battery box 32 and connected to the cable assembly 33. On both sides of the battery box is a clock box 34 with a timing clock 35 located therein which is not shown. The 630 pounds of explosive is located in container 36 and actuated by detonator 46 as shown in FIG. 1.

The clock starter switch 28 of FIG. 2 is closed by the pressure of the sea water on the pressure sensitive member 37 which energizes clock delay switches 38, not shown, in housing 39. The extender mechanism switch is in a time delay circuit for scuttling the device if it fails to fire within a predetermined time. The extender switch has a soluble washer 40 that provides a 6 to 13-minute time delay after launching. After 6 to 13 minutes the extender mechanism switch 29 is closed by the pressure of the sea water on member 41. As the mechanism closes an auxiliary switch 42 is closed in the delay circuit and the out-of-line detonator 43 is moved to the in-line position. A clock mechanism 34 then closes a switch to the power source which electrically fires the detonator 43 and booster 44 located in the extender well 45. Upon detonation of the booster the casing 11 is ruptured allowing sea water to enter. This renders the device inoperative and causes it to sink to the bottom.

Figure 3:
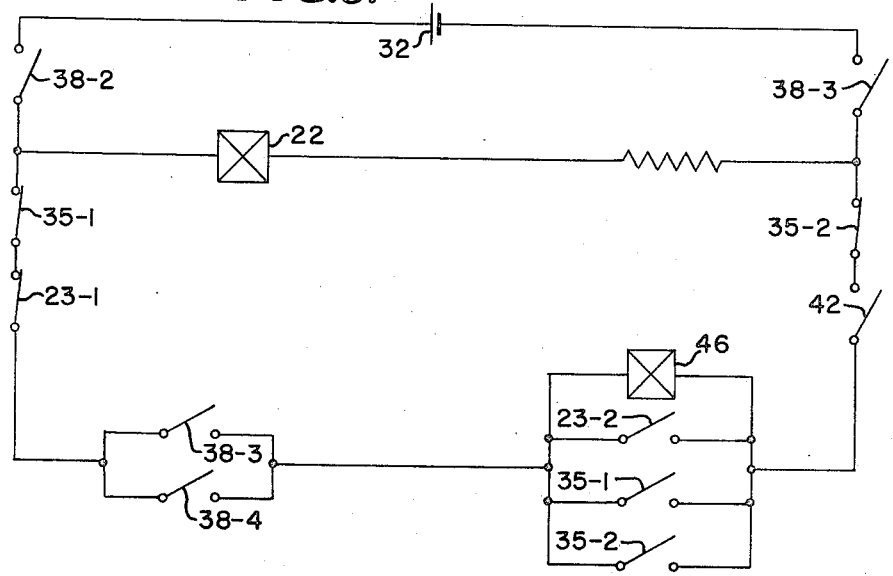
FIG. 3 is a one line diagram of the firing circuit of the invention.
Figure 4:
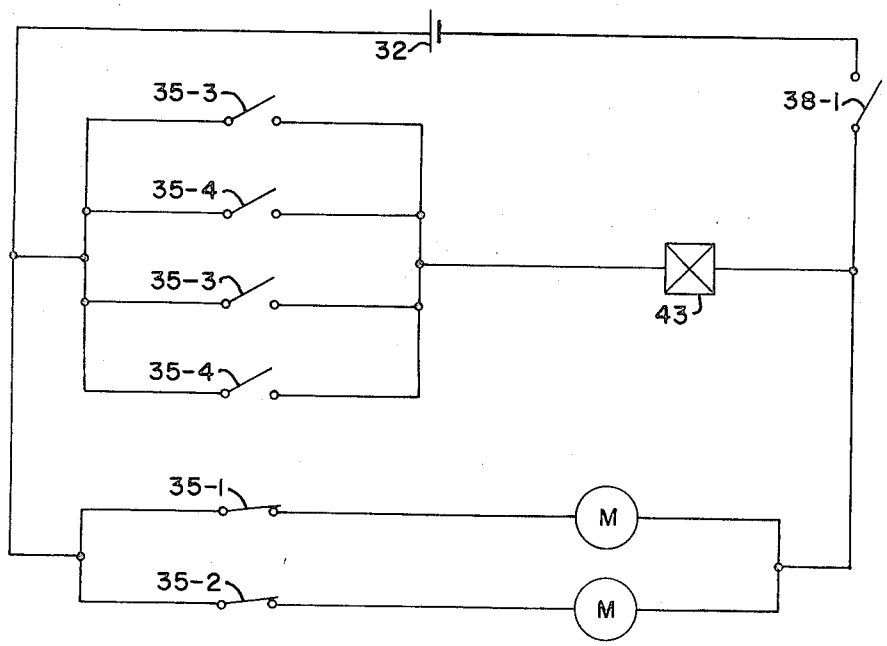
FIG. 4 is a one line diagram of the sterilizing circuit of the invention.

Referring now to FIGS. 3 and 4 showing the electrical diagrams of the firing circuit and scuttling circuit, respectively, of the unit. The timing of the switches will be described in detail. Upon the device being ejected from the tube the clock starter 28 is activated by hydrostatic pressure and starts the clock delay. The following clock delay switches 38 close in a sequential order. Switch 38-1 is closed energizing the scuttling circuit upon activation of the clock starter and completing the circuit to the motor clock switches 35-1, 35-2, initiating the operating cycle. Switch 38-2 is closed 13 minutes after launching and closes the break in the positive side of the float and the main firing circuit. Switch 38-3 closes 15 minutes after launching and closes one of two parallel breaks in the main firing circuit, firing the extender detonator 43. Switch 38-4 closes 16 minutes after launching closing the second parallel break to complete the main firing circuit. Switch 42 closes upon operation of the extender and closes a break on the negative side of the main firing circuit. This switch will reopen the circuit if the extender piston retracts due to low pressure. Switch 23 opens a first set of contacts 23-1 when the unit is at a depth greater than 87 feet thereby opening the positive side of the main firing circuit and closing it above 87 feet.

A second set of contacts 23-2 is closed when the unit is at a depth of 87 feet or below completing one of three parallel shunts across the main firing detonator and open it above 87 feet. The clock operated switches 35 operate in the following sequence. Switches 35-1, 35-2 open 45 ± 15 minutes after launching, opening both sides of the main firing circuit. Switch contacts 35-2 close 45 ± 15 minutes after launching completing two legs of a three-leg parallel shunt across the main firing detonator. Two switches 35-3, 35-4 open 75 ± 15 minutes after launching and complete a four-leg parallel break in the scuttler circuit rendering the device completely inoperative.

The arming of the device will be briefly described assuming the device is ejected in water at a depth greater than 150 feet. The safety bar is thrown off permitting the clock starter to operate under hydrostatic pressure. The clock delay switches 38 close starting the sterilization cycle. This provides power to two clock switches 35-1 and 35-2 starting their operation. The switches 38-2 and 38-3 also start the 13-minute delay arming time for firing the releasing pistol.

The hydrostatic switch 23 functions as a floor switch, containing a pair of switches, one of which is normally closed and the other normally open. When exposed to hydrostatic pressure at the planting depth, the normally closed switch opens, breaking the firing circuit, and the normally open switch closes, shunting the detonator. This protects the submarine in case the device should snag on part of the structure after being ejected. The device will be rendered ineffective after the scuttling circuit is operated 75 minutes later.

When the charge reaches a depth of 87 feet in the example assumed the hydrostatic switch retracts, closing the firing circuit and unshunting the detonator. The device continues to rise and moors with the float against the bottom of the ice. Before 13 minutes elapse, the soluble washer dissolves removing mechanical restraint from the extender piston. At 13 minutes elapsed time the hydrostatic switches 38-3 close firing the explosive fitting in the releasing pistol. This action cuts the retention cable, allowing the explosive compartment to sink and moor 14 feet below the float. Hydrostatic pressure at the mooring depth causes the extender to operate, closing the detonator circuit and mechanically inserting the detonator into the booster. If the charge fails to detonate then two clock delay switches 35-1, 35-2 close to insure the firing of the scuttling circuit without firing the main charge.

The operation of the device as shown in FIG. 5 will now be described. When the device is launched, the safety bar is thrown clear and the locking devices associated with the clock starter are released, permitting the hydrostatically operated clock starter to begin operation. As the device emerges from the tube, delay arming clock switches 38 and sterilizing clock switches 35 begin operation. The device travels along a horizontal line from the tube until the momentum of the device is dissipated whereupon it begins to rise, float-end first at a rate of approximately 6 to 8 feet per second. The charge continues to rise in a nearly vertical position until it makes contact with the underside of the ice-pack. The extender as shown in FIG. 7 prevents movement of the detonator 46 into the booster envelope 47 by the soluble washer 48 which prevents extender operation for a period of 6 to 13 minutes after launching.

When the device completes its upward travel, the float is in direct contact with the underside of the ice, while the clocks continue to run down and the soluble washer 48 dissolves. After the soluble washer dissolves the extender operates due to water pressure on diaphragm 49 and the detonator 46 moves into the booster envelope 47. A safety switch 42, associated with the extender is closed by the operation of the extender in placing the detonator in the firing circuit.

At the end of a 14-minute period, switch 38-3 will close in the clock delay mechanism. This action places a source of power in series with a squib 52 in the releasing pistol 22 as shown in FIG. 8. Initiation of the squib 52 permits a cutter 53 in the releasing pistol to sever the float retention cable 16. The slightly negative case thereupon separates from the float and slowly descends to a depth below the float equal to the length of the stand-off cable. The buoyancy of the float causes it to remain in contact with the underside of the ice pack.

Two minutes after the squid fires in the releasing pistol, closure of switches 38-3 and 38-4 completes the circuit from the battery source to the detonator and the charge explodes. A hole of 20 to 50 feet in diameter will be produced in the ice of a thickness ranging from 2 to 12 feet.

If for some reason the demolition charge does not explode, switches 35-3, 35-4, of the clock delay mechanism close energizing the sterilizing circuit for scuttling the device as shown in FIG. 6.

Firing of the scuttler ruptures a hole in the side of the charge compartment thereby flooding the case. This action occurs 75 minutes after the launching.

It is to be understood, of course, that the foregoing disclosure relates to only a preferred embodiment of the invention and that numerous modifications or alterations may be made therein without departing from the spirit and the scope of the invention as set forth in the appended claims.

What is claimed is:

1. A surface seeking underwater demolition device capable of being ejected from a torpedo tube for blasting a passageway in an ice pack to allow an underwater craft to surface comprising a casing, a float removably attached to one end of said casing, said float causing the device to be buoyant so that it will rise to the underside of the ice pack, guide fins removably attached to the other end of said casing, a copious quantity of explosives located in said casing, a hydrostatically actuated switch in said casing, delay means actuated by said hydrostatic switch for delaying operation of said device a short period of time, a source of electrical power connected to one side of said delay means, an electro-responsive squib connected between the other side of said delay means and said source of electrical power, a releasing pistol located on said casing with said squib mounted therein, a connecting cable normally holding said float to said casing and passing through said releasing pistol, a cutter located in said releasing pistol for cutting said connecting cable when operated by said squib to release said float, a standoff cable attached to said casing and said float for suspending said casing at a depth of several feet below said float, an electrical switch, pressure sensitive means for determining when the casing has been suspended below said float and for closing said electrical switch, and detonating means connected to said source of electrical power by said electrical switch for detonating the quantity of explosives.

2. The demolition device of claim 1 wherein said second pressure sensitive means is a hydrostatic switch having mechanical means to hold said switch out of position until the casing and float has arrived at the underside of the ice cap.

3. The demolition device of claim 2 wherein the mechanical means for holding the hydrostatic switch out of position is a water soluble washer.

* * * * *